(12) United States Patent
Vidal

(10) Patent No.: US 7,175,371 B2
(45) Date of Patent: Feb. 13, 2007

(54) PROTECTIVE SHIELD FOR A TOOL

(76) Inventor: Robert J. Vidal, 12001 Woodside Ave. #159, Lakeside, CA (US) 92040

( * ) Notice: Subject to any disclaimer, the term of this patent is extended or adjusted under 35 U.S.C. 154(b) by 421 days.

(21) Appl. No.: 10/623,424

(22) Filed: Jul. 18, 2003

(65) Prior Publication Data

US 2005/0013674 A1   Jan. 20, 2005

(51) Int. Cl.
*B23B 47/34* (2006.01)

(52) U.S. Cl. .................. 408/1 R; 408/67; 408/16

(58) Field of Classification Search ........... 408/1 R, 408/67, 16, 112; 362/119; 409/137
See application file for complete search history.

(56) References Cited

U.S. PATENT DOCUMENTS

| | | | | |
|---|---|---|---|---|
| 2,198,288 A | * | 4/1940 | Leaman | 408/112 |
| 2,339,324 A | * | 1/1944 | Fischer | 408/56 |
| 2,792,199 A | * | 5/1957 | Becker et al. | 175/211 |
| 3,583,821 A | * | 6/1971 | Shaub et al. | 408/72 R |
| 3,936,213 A | * | 2/1976 | Kappel | 408/67 |
| 5,152,327 A | * | 10/1992 | Shoda | 144/48.1 |
| 5,333,973 A | * | 8/1994 | Hoshino et al. | 408/56 |
| 5,356,245 A | * | 10/1994 | Hosoi et al. | 408/56 |
| 5,522,683 A | * | 6/1996 | Kakimoto et al. | 408/13 |
| 5,653,561 A | | 8/1997 | May | |
| 6,276,878 B1 | * | 8/2001 | Lee | 408/67 |
| 6,457,915 B1 | * | 10/2002 | Kao | 408/67 |
| 6,503,029 B1 | * | 1/2003 | Ende et al. | 408/1 R |

FOREIGN PATENT DOCUMENTS

| | | | | |
|---|---|---|---|---|
| DE | 3140776 A | * | 4/1983 | |
| GB | 2096029 A | * | 10/1982 | |
| GB | 2096030 A | * | 10/1982 | |
| GB | 2343645 | * | 5/2000 | |
| JP | 63016910 A | * | 1/1988 | |

* cited by examiner

*Primary Examiner*—Monica Carter
*Assistant Examiner*—J Williams
(74) *Attorney, Agent, or Firm*—David B. Waller & Associates

(57) ABSTRACT

A protective shield for a drilling or cutting tool having a cylindrical-shaped housing that has a front end and a back end, the front end able to fit flush against a working surface; and a spring having a first end and a second end, the first end able to receive the back end of the cylindrical-shaped housing and the second end able to receive a drilling or cutting tool chuck; the cylindrical-shaped housing able to receive debris from the drilling or cutting tool operation.

9 Claims, 3 Drawing Sheets

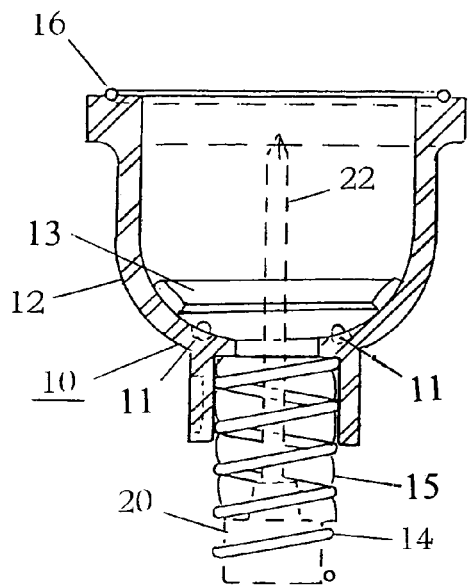
Figure 1
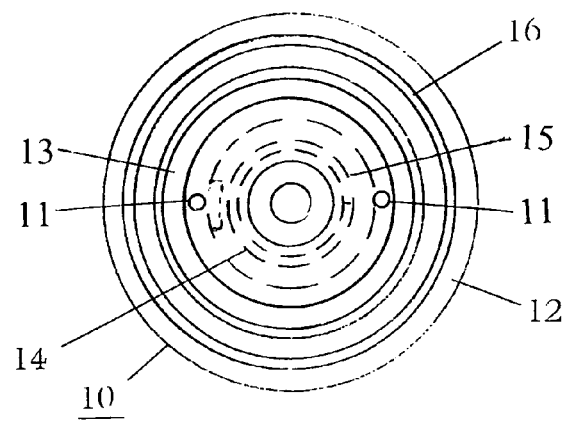
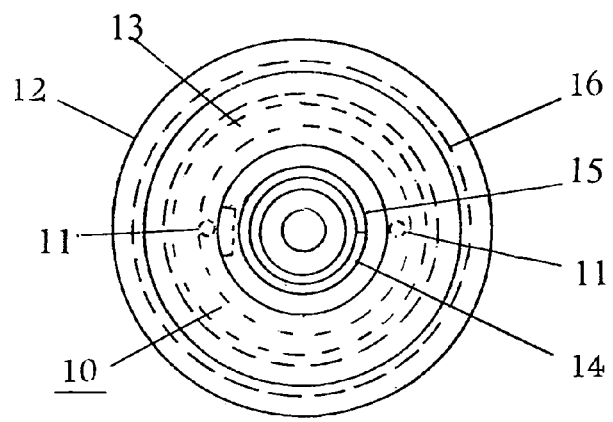
Fig. 1A
Fig. 1B
Fig. 1C

Figure 2
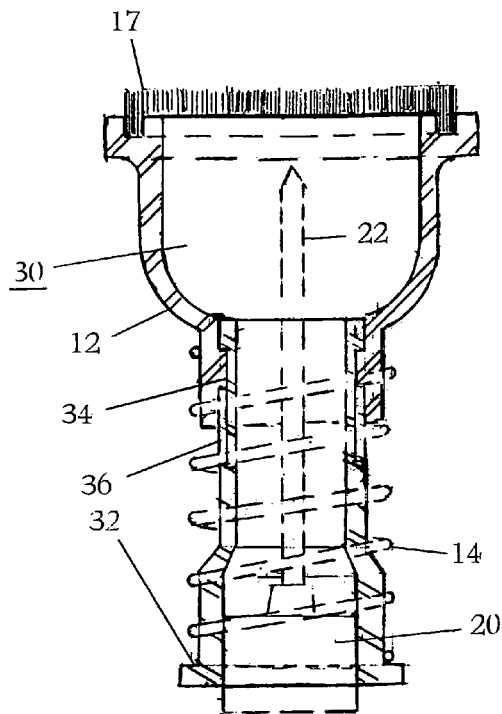
Fig. 2A
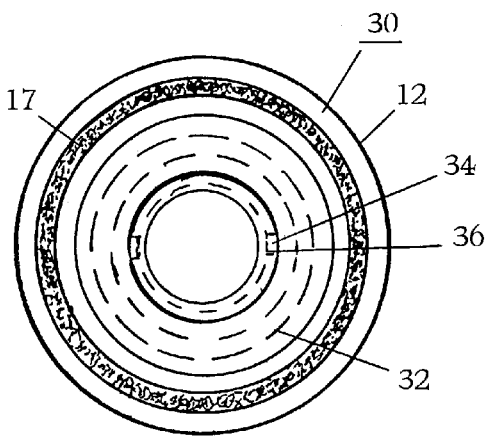
Fig. 2B
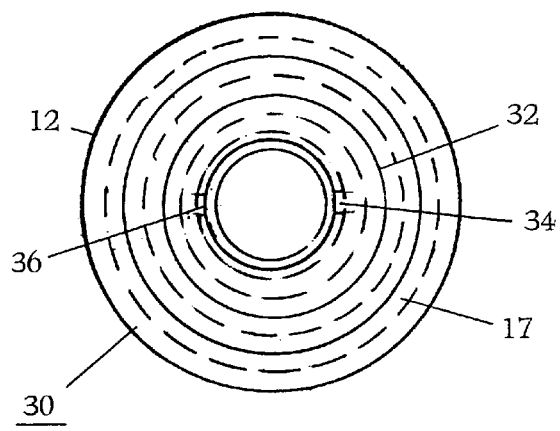
Fig. 2C

PROTECTIVE SHIELD FOR A TOOL

TECHNICAL FIELD

The present invention relates to protective devices used in conjunction with tools for drilling or cutting. In particular, a device for shielding the operator from debris emitted from drilling or machining operations in high-density materials such as stone or metal.

BACKGROUND OF THE INVENTION

A wide variety of cutting and drilling tools are used in both the commercial and private sectors worldwide for a variety of purposes including construction, fabrication and manufacturing. One disadvantage of using these tools is the debris emitted during the tooling operations. When working with high-density materials such as for example metal, stone or ceramics, injury can result when this debris comes in contact with the operator. Drilling or cutting operations in high-density materials generally requires a sharp cutting edge moving at high speed to effect the desired result. Such speeds are usually achieved with power tools. This action of cutting or drilling creates a substantial amount of friction, which increases the temperature at the interface between the cutting edge and the material. Often times these temperatures can reach several hundred degrees. Oil is often used to lubricate the cutting edge, which facilitates cutting by reducing the heat created by friction. While this tends to decrease the temperature of the working surface, it still may maintain temperatures of a few hundred degrees. When debris such as shavings, burrs or chips are created from machining operations they are generally hot and discharged from the cutting surface at high velocity. Consequently, injury can result if this debris impacts the user or others in the immediate area. Correspondingly, items in the immediate area may also be damaged if they come in contact with this debris.

Presently, the use of safety glasses and gloves offer some protection to the operator's eyes and hands when using power tools. Long sleeved shirts and pants also aid in protecting other areas of the body. However, safety glasses cannot protect against searing hot debris that enters from above and along the sides where the safety glasses do not fit flush against the face. In addition, collar and sleeve openings that are not securely sealed can provide access to this potentially dangerous debris. Finally, clothing may not protect the user from high velocity impacts, which can penetrate the cloth, and while certain clothing may be resistant to high impact, it may still scorch or potentially catch fire.

Consequently, there is a need in the industry for a safety device that prevents injury resulting from the impact of potentially hot and sharp debris occurring from machining operations such as from drilling or cutting metal, stone or other high-density materials.

SUMMARY OF THE INVENTION

The present invention provides a protective shield for a drilling or cutting tool comprising a cylindrical-shaped housing having a front and back ends and a spring having first and second ends. The front end of the cylindrical-shaped housing is able to fit flush against the working surface. The first end of the spring is able to receive the back end of the cylindrical-shaped housing and the second end is able to receive a drilling or cutting tool chuck.

In one embodiment the cylindrical-shaped housing may be provided in a variety of shapes including conical cylinder shaped, semi-elliptical cylinder shaped, semi-oval cylinder shaped, semi-elliptical conical shaped or semi-oval conical shaped. It may also be prepared from a variety of materials having particular desirable characteristics such as strength and durability, heat and impact resistance, and transparency. Preferably the cylindrical-shaped housing is cup shaped and made of a impact and heat resistant, transparent material.

In another embodiment the protective shield further comprises a foam tube. The foam tube has an exterior surface able to be received within the spring and an interior surface able to receive a drilling or cutting tool bit.

In yet another embodiment the protective shield further comprises a chamber formed between the drilling or cutting tool chuck and the back end of the cylindrical-shaped housing to capture debris from drilling or cutting operations. Alternatively, the back end of the cylindrical-shaped housing further comprises a magnet to capture magnetically susceptible debris from the drilling or cutting tool operation.

In still another embodiment the cylindrical-shaped housing further comprises a sliding means to protect the working surface from damage. In a preferred embodiment the cylindrical-shaped housing comprises bristle fibers along the front end.

In another aspect of the present invention the protective shield further comprises a tubular guide to maintain the centerline of the protective shield on the centerline of the drilling or cutting tool. The guide has a top end, a bottom end, an internal surface and an external surface. The internal surface of the bottom end is able to receive a drilling or cutting tool chuck and the bottom end external surface is able to be received by the first end of the spring. The top end external surface is able to be received by the back end of the cylindrical-shaped housing. In addition, the second end of the spring is able to receive the back end of the cylindrical-shaped housing and has a retention means so that the cylindrical-shaped housing is maintained on the guide during use.

The guide may be made of a variety of materials having desirable characteristics such as heat and impact resistance. Preferably the guide is made of the same material as the cylindrical-shaped housing.

In one embodiment of this aspect of the invention the protective shield further comprises a chamber formed between the drilling or cutting tool chuck and the bottom end of the guide to receive debris from the drilling or cutting tool operation. Alternatively the guide may comprise a magnet to capture magnetically susceptible debris from the drilling or cutting tool operation.

In another aspect of the invention the protective shield may further comprise an extension means. The extension means comprises a first tubular body and a second tubular body. The first tubular body has an upper end, a lower end, an outer surface and an inner surface. The upper end is able to be received by the bottom end of the cylindrical-shaped housing. The second tubular body has a a primary end, a secondary end, an inside surface and an outside surface. The secondary end is able to receive the drilling or cutting tool chuck and the inside surface is able to receive the lower end of the first tubular body.

In another embodiment of the present invention the protective shield further comprises a lighting means to illuminate the working surface. The lighting means comprises a power supply connected to at least one light source and a switch connected between the power supply and the at least one light source to control the supply of power to the at least one light source. Preferably the at least one light source is a light emitting diode.

In yet another aspect of the present invention a method for preventing injury from debris resulting from the operation of a drilling or cutting tool is provided comprising the steps of affixing a protective shield onto a drilling or cutting tool and operating the drilling or cutting tool.

In still another aspect of the invention a kit is provided comprising at least one protective shield for a drilling or cutting tool and at least one guide to maintain the centerline of the protective shield on the centerline of the drilling or cutting tool. The kit may further comprise at least one extension means.

DESCRIPTION OF THE FIGURES

FIG. 1: Is a diagrammatic representation of the protective shield of the present invention showing (A) a cross sectional view; (B) the top view; and (C) the bottom view;

FIG. 2: Is a diagrammatic representation of the guide that may be affixed to the protective shield showing (A) a cross sectional view; (B) the top view; and (C) the bottom view.

DETAILED DESCRIPTION

Figures 3, 3A, 3B, 3C:
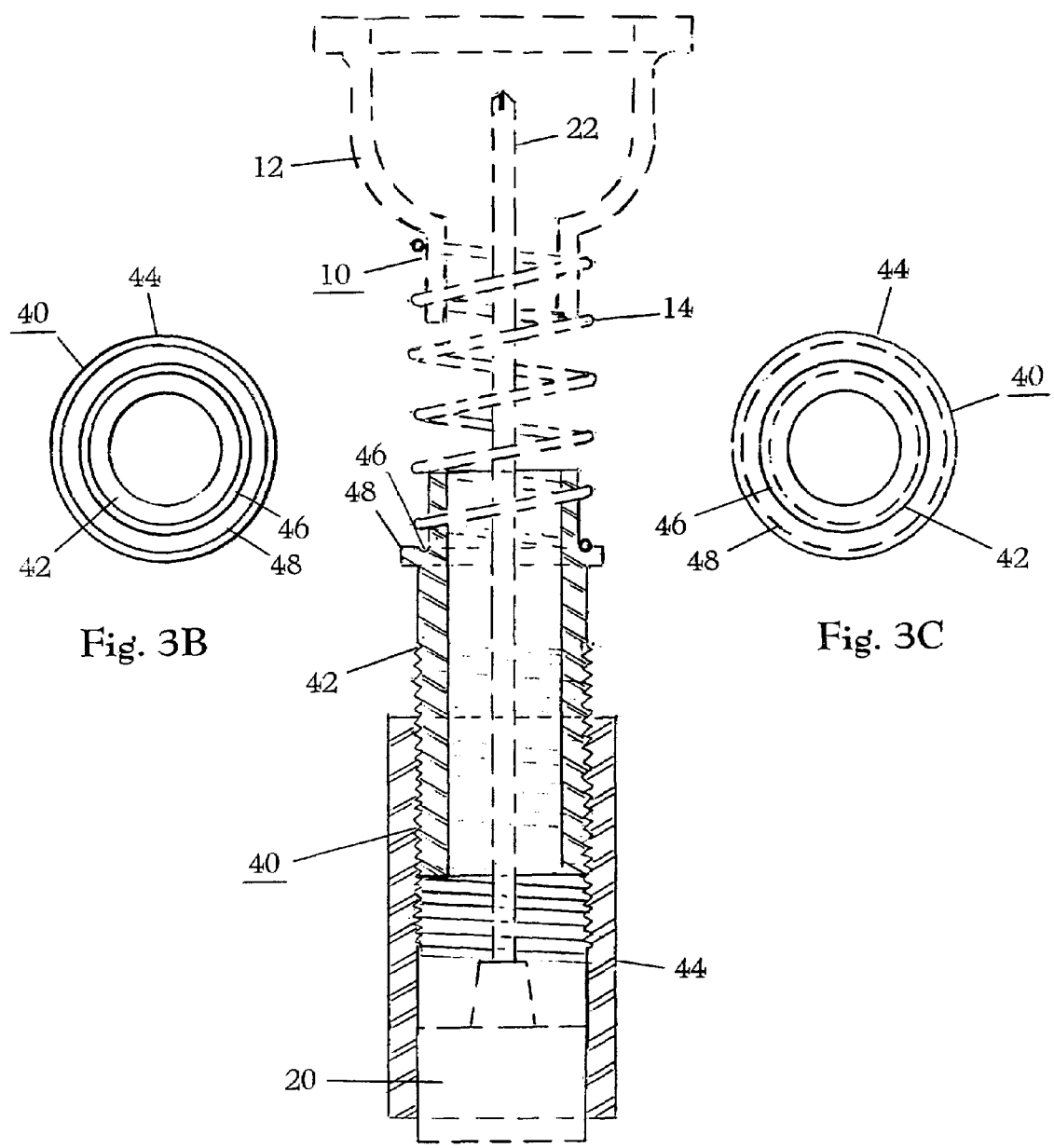
FIG. 3: Is a diagrammatic representation of the elongation means that may be affixed to the protective shield showing (A) a cross sectional view; (B) the top view; and (C) the bottom view.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail.

The term "debris" as used herein refers to particles emitted from the surface of a working material as a result of tooling or machining operations. Such debris may include for example shavings, burrs or chips.

The terms "operating", "operation" or "operations" as used herein refers to the act of using a tool to alter the character of a working material such as by drilling a hole, cutting into a desired shape, or driving a screw into the surface or the like by methods known to one skilled in the art.

The term "working materials" as used herein refers to a variety of materials such as for example metal, plastics, wood, and glass used in the construction, fabrication or manufacturing of a variety of items such as structures, furniture, vehicles, or equipment.

The term "affixed" or "affixing" as used herein refers to a means for fastening or connecting, permanently or reversibly, one element of the invention to another element by a variety of methods known to one skilled in the art. Such means for fastening or connecting include for example a adhesively binding or press-fitting the cylindrical-shaped housing onto the spring.

The term "sliding means" as used herein refers to the ability of an element of the invention that allows an other element such as the cylindrical-shaped housing to move relatively smoothly and effortlessly across a working surface without damaging the surface by for example marring, scratching, scraping or gouging the materials surface.

The term "retaining means" as used herein refers to the ability of an element of the invention to prohibit another element of the invention such as the cylindrical-shaped housing from separating from another element of the invention such as the guide.

The term "extension means" as used herein refers to the ability of an element of the invention to increase the length or reach of another element of the invention such as using the extension means to increase the length of the cylindrical-shaped housing.

The present invention provides a protective shield for a drilling or cutting tool comprising, a cylindrical-shaped housing having a front end and a back end, the front end able to fit flush against the working surface, and a spring having first and second ends, the first end able to receive the back end of the cylindrical-shaped housing and the second end able to receive a drilling or cutting tool chuck.

The Cylinder-Shaped Housing

The cylindrical-shaped housing 12 when placed flush against a working surface creates a chamber to capture debris emitted from the surface of a working material as a result of a tooling or machining operation.

The cylindrical-shaped housing 12 may be provided in a variety of shapes such as for example conical cylinder shaped, semi-elliptical cylinder shaped, semi-oval cylinder shaped, semi-elliptical conical shaped or semi-oval conical shaped. Preferably the cylindrical-shaped housing 12 is cup shaped wherein the front end diameter is larger than the back end diameter.

The diameter of the front may vary depending on the size of the drill bit 22 or cutting blade being used. Preferably the internal diameter of the front end is sufficient to allow for free release of debris from the material surface without causing the chamber formed by the cylindrical-shaped housing 12 against the working surface to over-fill with debris from the tooling operation. Consequently, the internal diameter of the housing 12 may be selected based on the operation being performed. For example, if a hole is being drilled through the surface of a material several inches thick it may be beneficial to have a large capacity housing to receive a substantial amount of debris anticipated from the operation. Correspondingly, if the material being cut is 5 to 6 inches in length and less than $\frac{1}{16}$ inch in thickness a smaller volume housing may be more appropriate based on the amount of debris anticipated from this operation.

While the diameter of the front end may vary as stated above, it is generally not less than $\frac{1}{2}$ inch and not more than 14 inches. Preferably, the front end is not less than about $\frac{3}{4}$ inch and not more than about 10 inches in diameter and most preferably, not less than about one inch and not more than about 5 inches in diameter.

The thickness of the material used to form the cylindrical-shaped housing 12 is preferably not less than about $\frac{1}{16}$ inch and not more than about $\frac{3}{16}$ inch.

The front end may further comprise a sliding means 16 that allows the protective shield to move or slide over the working surface without damaging, harming or otherwise marring the working surface. Such a sliding means 16 may be provided in a variety of constructions and configurations known to those skilled in the art such as for example a lubricated o-ring inserted within the front end of the protective shield or a Teflon™ coated surface integral to or incorporated into the front end of the device 10. If a lubricated o-ring is preferred the front end of the protective shield may have a seat that is able to receive and maintain the o-ring in position during use. If a Teflon™ coated surface is preferred the front end may be treated with a desirable thickness of Teflon™. Correspondingly, a Teflon™ ring may be affixed onto or inserted within the front end of the protective shield and securely positioned for use. In this case, the front end of the protective shield may be adapted to receive the Teflon™ ring. For example, the front end may be provided with a snap-clip mechanism to allow the ring to be snapped into position. It may be provided with a press-fit surface to allow the Teflon™ ring to be press-fit onto the front end of the protective shield or it may be provided with a seat to allow the Teflon™ ring to be adhered to the front end, for example, by adhesive.

Alternatively, bristles 17 extending outward from, and generally perpendicular to, the front end surface may be provided in a variety of configurations that allow the device 10 to mold to a non-linear or non-flat surface, prevent damage to the working surface, allow ease of movement of the device 10 across the working surface and reduce the escape of debris from the protective shield. The bristles 17 are preferably positioned along the entire front end in a continuous ring having a width generally not less than the width of a single bristle and not more than about 1 inch. The dimensions of a single bristle anticipated for use in the present invention is similar to those used in the industry for paintbrushes, tooth brushes or sweeping brushes. The width of a single bristle may vary depending on the linear tensile strength desired for the work surface and type of tool to which the device 10 will be applied. For example, during high speed operations it would be beneficial to have a tensile strength and bristle volume that would resist penetration of the bristles 17 by high-speed debris emitted from the working surface. While drilling at low speed in an expensive working material such as an exotic wood may require a less rigid bristle that provides some flexibility to prevent damage to the working surface yet prevent debris from escaping the protective shield. Preferably the bristle width is not less than the width of an animal hair generally used in the production of bristles 17 and not more than 1/16 inch. The length of the bristles 17 will depend on the type of tool and the bristle tensile strength. If the tool is a high-speed power tool it is preferable that the bristles 17 be stiff and therefore generally short while for lower speed tools such as those powered by hand a less stiff and generally longer bristle would be acceptable. Preferably the length of the bristle is from about 1/8 inch to about 1-1/2 inches.

While the bristles 17 are primarily used for ease of guiding the protective shield across a working surface they must also prevent debris from escaping the device 10. Consequently, it is beneficial that multiple rows of bristles 17 be provided to form a penetration resistant barrier to debris. Preferably the number of rows provided will depend on the tensile strength of the bristles 17 and is preferably not less than three rows. The rows may be aligned such that the bristles 17 are oriented one in front of the other or the rows may be oriented so that the bristles 17 are staggered. In a preferred embodiment the width of the multiple rows of bristles 17 is about 1/8 inch to about 1/2 inch and most preferably about 1/4 inch.

The back end of the cylindrical-shaped housing 12 may be the same or smaller than the diameter of the front end. Preferably the back end diameter is less than the diameter of the front end. The back end of the housing 12 is designed to be able to receive the first end of the spring 14. In this configuration the internal diameter of the back end is preferably slightly less than the exterior diameter of the spring 14. The length of the back end may vary but is preferably from about 1/2 inch to 2 inches, most preferably about 3/4 inch to 1-1/2 inches. Affixing the back end of the cylindrical-shaped housing 12 to the first end of the spring 14 may be done by a variety of methods known to those skilled in the art such as for example by press fitting, screw threads, or the use of adhesive. Preferably the spring 14 is securely press fit into the back end of the cylindrical-shaped housing 12. The second end of the spring 14 is affixed to the tool chuck 20. Because the number and variety of tool chucks may vary to a great degree the internal diameter of the spring 14 will likewise vary depending on the tool being used. Preferably the internal diameter of the second end of the spring 14 is not less than about 1/2 inch and not more than about 7 inches. Most preferably, the second end is not less than about 1 inch in diameter and not more than about 4 inches in diameter.

In use a chamber is created between the cylindrical-shaped housing 12 and the working surface. This chamber will capture debris when the tool is oriented over the working surface. However, when performing a tooling operation from underneath a working material such as on a ceiling for example, it would be beneficial to have a chamber near the back end of the cylindrical-shaped housing 12 to capture debris. This chamber may be provided in a variety of configurations known to those skilled in the art. For example, a chamber may be formed during use between the tool chuck 20 and the interior surface of the back end. To prepare such a chamber the back end may be constructed such that the cross-sectional view of each side of the back end resembles the letter "J". The left side of the cross-sectional view resembling a backwards "J" and the right side of the cross-sectional view resembling the letter "J" with the long sides of the "J" forming one chamber wall contributed by the back end of the protective shield, the loop of the "J" forming the base of the chamber and the small side of the "J" fitting generally flush with the tool chuck 20 and the tool chuck 20 forming the other chamber wall.

In another similar configuration the back end further comprises a magnet 13 to assist in the capture of magnetically susceptible metallic debris. It is preferable to position the magnet at a location where it may exert the most benefit and capture a substantial amount of magnetically susceptible debris during use. Consequently, one skilled in the art would recognize that the magnet 13 could be located in a number of positions within the protective shield. For example, if the shield is placed on a drilling tool used for inserting screws on the underside of a metallic surface it would be beneficial to locate the magnet 13 near the back end of the protective shield. Alternatively, if one is positioned above a metallic sheet of material performing a cutting operation it may be beneficial to have the magnet 13 positioned close to the front end of the protective shield. In addition, one skilled in the art could envision multiple magnets 13 placed in strategic locations on the protective device 10 for use in a variety of positions. These magnets 13 may be affixed in position by snap-fit, press-fit or adhesive. Correspondingly, one skilled in the art could provide a single magnet 13 that is removable and able to be relocated to other positions within the protective shield. In this case the protective shield may also comprise one or more positioning adapters to allow placement and removal of a magnet 13 such as for example a snap-clip that will securely hold a magnet 13 during tool use and will allow removal of the magnet 13 for relocation on the protective shield.

The length of the cylindrical-shaped housing 12 from the front end to the back end is generally not less than about 3/4 inch and not more than about 10 inches. Preferably, it is about 1 inch and not more than about 8 inches in length and most preferably from about 2 inches to about 6 inches. The cylindrical-shaped housing 12 may be provided in a number of pieces that may be assembled by the manufacturer or by the user. For example, the cylindrical-shaped housing 12 may be provided with a slidable means such as a Teflon™ ring and a magnet that may be constructed as single form molded piece of polymer plastic in which the Teflon™ ring and magnet are embedded.

The cylindrical-shaped housing 12 may further comprise a light source 11 or an adapter for affixing a debris removal system such as a vacuum. Often times tooling operations must be conducted in areas in which there is not adequate lighting. In these circumstances one skilled in the art can imagine incorporating a light source 11 within the protective shield to allow the user to view the working area during a tooling operation. In such a configuration the protective shield would be translucent and would comprise a lighting system which may include one or more light emitting diodes arranged within or on the exterior of the protective shield, an energy source such as one or more batteries and a switch positioned between the light source 11 and battery to allow the user to control the lighting. The electronic configuration of such a system is well known in the art and may be purchased commercially.

In addition, it may be beneficial during use to remove collected debris from the protective shield to avoid having to empty the shield periodically. An adapter may be provided for affixing a vacuum system to the protective shield, which would remove debris as it is created and released from the tooling operation. In a preferred configuration the protective shield has an adapter provided on the cylindrical-shaped housing 12 to allow a vacuum to be affixed. One skilled in the art would recognize that if such a vacuum system were employed that vents would have to be provided within the protective shield to allow the air to circulate and the vacuum to extract the forming debris. Such vents could be provided that would prevent the escape of high velocity debris by a variety of configurations known to those skilled in the art such as for example vents that do not have a direct, or non-linear, path through the cylindrical-shaped housing 12. Such vents might include at least two 90°-angle turns to prevent escape of debris.

The Spring

The spring 14 provides constant pressure against the cylindrical-shaped housing 12 forcing it flush against the working surface during the tooling operation. In use the operator places the front end of the protective shield on the working surface and aligns the tool and its bit 22, self-drilling screw or cutting tool against the working material by compressing the spring 14. The force with which the spring 14 exerts against the working surface serves to maintain the cylindrical-shaped housing 12 flush with the working material to trap the emitted shavings and burrs. The pressure that the spring 14 exerts should be sufficient to hold the front end of the cylindrical shaped housing 12 against the working surface but not so great a force to become burdensome on the user during extended or continued use. A variety of configurations known to those skilled in the art may be utilized to achieve the desired amount of tension when compressing the spring 14. In addition, the type of material and its dimensions used to construct the spring 14 can affect the compression strength. Consequently, one skilled in the art may select an optimal material based on the desired spring tension, durability, consistency and strength. These materials include for example metal, plastic or polymer. In a preferred embodiment the spring 14 is made of metal and spiral wound.

The spring 14 of the present invention is provided with first and second ends. The first end preferably has an internal diameter that is able to receive the external surface of the back end of the cylindrical-shaped housing 12. Alternatively, the external diameter of the first end of the spring 14 may be able to be received by the internal surface of the back end of the cylindrical-shaped housing 12. The first end of the spring 14 may be affixed to the back end of the cylindrical-shaped housing 12 by a variety of methods known to those skilled in the art including for example, press-fit, snap-fit or by threads.

The diameter of the internal surface of the second end of the spring 14 is preferably able to receive the tool chuck 20. While a variety of methods may be used to affix the second end of the spring 14 to the tool chuck 20 it is preferably press-fit.

The length of the spring 14 is such that a portion of the first end of the spring 14 may be affixed to back end of the cylindrical-shaped housing 12, a portion of the second end may be affixed to the tool chuck 20 and a portion between both ends which allows the user to bring the cutting tool bit 22 in contact with the working material surface once the front end of the cylindrical-shaped housing 12 is flush against the working surface. Preferably, the spring 14 is not less than about 2 inches in length and not more than about 10 inches. Most preferably, the spring 14 is about 2.5 inches to about 6 inches long.

In one embodiment the spring 14 is encased with a flexible membrane to assist in preventing the escape of debris from the protective shield. This membrane may be made of a variety of materials known in the art that are flexible, resistant to tearing or wear due to repetitive spring compression, and heat resistant. Such materials include for example, cloth, plastic or polymer. The membrane may be form molded onto the spring 14 or attached at both ends of the spring 14.

Alternatively, a foam core may be utilized to prevent debris from escaping the protective shield. The foam core may be formed generally in the shape of a tube having an internal diameter able to receive a tool bit 22 without significantly contacting the bit 22 during use and an external diameter able to be received by the internal diameter of the spring 14. Correspondingly, the foam core 15 may have an internal diameter able to receive the exterior diameter of the spring 14 such that the foam core 15 encases the spring 14. One skilled in the art would recognize that when such a tubular foam core 15 is compressed the internal diameter may decrease, consequently such a decrease would be taken into consideration when selecting a diameter such that the foam core 15 interior wall does not significantly interact with the tool bit 22 during operations. More specifically, the foam core 15 internal diameter would preferably be selected such that upon compression, the foam core 15 would not interfere with or be damaged by the tooling operation. The length of the foam core 15 will depend on the length of the tool bit 22, the tool bit chuck 20 and the back end of the protective shield. Preferably the foam core is a length that allows one end of the foam core 15 to fit flush against the tool bit chuck 20 and the other end to extend into the back end of the cylindrical-shaped housing 12 about ⅛ to about ½ inch when the spring 14 is in its resting position or non-compressed state. The length of the foam core 15 is from about ½ inch to about 12 inches, preferably from about 1 inch to about 6 inches and most preferably from about 2 inches to about 4 inches.

The Guide

A guide 30 is provided to maintain the centerline of said protective shield on the centerline of said drilling or cutting tool. When performing a drilling or cutting operation it is often times desirable to make the drill hole or cut at a 90° angle. The guide 30 allows the user to maintain a substantially perpendicular position over the working surface and to maintain that position during the tooling operation.

The guide 30 has top and bottom ends and internal and external surfaces. The internal surface of the bottom end is able to receive a drilling or cutting tool chuck 20 and the bottom end external surface is able to be received by the second end of the spring 14. The top end external surface is able to be received by the back end of the cylindrical-shaped housing 12 and has a retention means to maintain the cylindrical-shaped housing 12 on the guide 30 during use.

The guide 30 may be made of a variety of materials including metal, plastic or polymer. Preferably the guide 30 is made of the same material used to construct the cylindrical-shaped housing 12. The thickness of the material used to form the guide 30 is preferably between about 1/16 inch and not more than about 3/16 inch.

The guide 30 may also be provided in a variety of configurations. In a preferred configuration the guide 30 is tubular-shaped with one or more linear parallel grooves 34 along its length. Preferably these grooves 34 are on opposite sides of the external surface of the guide 30. In this configuration the cylindrical-shaped housing 12 would have one or more linear parallel ridges 36 on the internal surface of the back end that fit into the grooves 34 of the guide 30. Preferably these one or more ridges 36 are not less than about 1/4 inch and not more than about 2 inches along the internal surface of the back end. This configuration prevents rotation of the cylindrical-shaped housing 12 on the guide 30 during use and assures that the tool bit 22 maintains its generally 90° angle with the working surface. In another configuration the internal surface of the back end of the cylindrical-shaped housing 12 is tubular having a diameter slightly larger than the diameter of the external surface of the guide 30 and having a preferred length of from about 1/2 inch to about 2 inches. This will allow the cylindrical-shaped housing 12 to move freely over the guide 30 while maintaining a 90° angle with the working surface.

The guide 30 may further comprise a lip continuously or non-continuously along the top end to allow the cylindrical-shaped housing 12 to fit flush against the lip under tension of the spring 14 thereby maintaining the cylindrical-shaped housing 12 on the guide 30.

The internal surface diameter of the bottom end is approximately the same as or slightly larger than the diameter of the tool chuck 20 on which the guide 30 will be affixed. The guide 30 may be affixed to the tool chuck 20 in a variety of methods known to those skilled in the art including for example, snap-fit, press-fit or clamp. When the affixing means is a clamp it may be a "C" clamp or compression clamp. Preferably the guide 30 is affixed to the tool chuck 20 by press-fit. Alternatively, the external surface of the bottom end may further comprise threads to allow it to be affixed to the second tubular body of the extension means 40 to allow the guide 30 to accommodate longer length tool bits 22.

The external surface of the bottom end is provided with a means for affixing the second end of the spring 14. A variety of means known to those skilled in the art may be used for example this means could be a seat 32 provided continuously or discontinuously around the perimeter of the bottom end or near the bottom end of the guide 30. The seat 32 may be provided as a ledge or gutter in which the second end of the spring 14 fits flush against or is secured within. Correspondingly the guide 30 may be provided with clips that allow the second end of the spring 14 to be snapped into place. Since the length of the guide 30 will vary depending on the length of the drilling or cutting tool bit 22 the affixing means for the first end of the spring 14 may be provided at any location along the exterior surface of the guide 30 based on the length of the spring 14 selected for proper function of the protective shield. The internal diameter of the spring 14 is preferably greater than the external diameter of the guide 30 at the location of affixing to allow the spring 14 to operate freely without interference from the surface of the guide 30.

The top end is able to be received by the back end of the cylindrical-shaped housing 12 and has a retention means to maintain the cylindrical-shaped housing 12 on the guide 30 during use. The diameter of the external surface of the top end is slightly less than the diameter of the back end of the cylindrical-shaped housing 12 to allow the cylindrical-shaped housing 12 to move freely over the guide 30.

A variety of retention means constructions known to those skilled in that art may be provided on the top end of the guide 30. In one configuration a cap is provided having a tubular-shaped body of a diameter slightly less than the diameter of the internal surface of the top end of the guide 30. The top of the cap may be circular having a diameter larger than the internal diameter of the cylindrical-shaped housing 12 and of a thickness that resists bending or breaking. Preferably the thickness is not less than about 1/16 inch and not more than about 1/4 inch. The top further comprises an aperture to permit a tool bit 22 to pass through. The cap may be affixed into place by a variety of methods including for example press-fit, snap-fit or adhesive. In this configuration the second end of the spring 14 is affixed to the external surface of the guide 30. The top end of the guide 30 is then inserted through the back end of cylindrical-shaped housing 12 affixing the first end of the spring 14 to the back end of the cylindrical-shaped housing 12. The cylindrical-shaped housing 12 is passed down over the guide 30, compressing the spring 14 and exposing the top end of the guide 30. The cap is then affixed to the top end and the cylindrical-shaped housing 12 released to fit flush against the ridge created by the top of the cap by the tension of the spring 14.

The Extension Means

An extension means 40 is provided to accommodate the use of different length tool bits 22 during tooling operations. The extension means 40 comprises first and second tubular bodies. The first tubular body 42 has upper and lower ends and outer and inner surfaces. The upper end is able to be received by the second end of the spring 14. The second tubular body 44 has primary and secondary ends and inside and outside surfaces. The secondary end is able to receive the drilling or cutting tool chuck 20 and the primary end is able to receive the lower end of the first tubular body.

The extension means 40 may be made of a variety of materials including metal, plastic or polymer. Preferably the extension means 40 is made of the same material used to construct the cylindrical-shaped housing 12. The thickness of the material used to form the extension means 40 is preferably between about 1/16 inch and not more than about 3/16 inch.

The extension means 40 may also be provided in a variety of configurations known to those skilled in the art. For example, the inside surface of the second tubular body 44 may be threaded. In this configuration the outer surface of the first tubular body 42 is correspondingly threaded so that the two tubular bodies may be joined together and the length of the extension means 40 adjusted based on the how far the first tubular body 42 is threaded onto the second tubular body 44. Alternatively, the length of the extension means 40 may be adjusted by press-release buttons. In this configuration the first tubular body 42 has an outer surface diameter slightly less than the inside surface diameter of the second tubular body 44 such that the first tubular body 42 is able to move freely within the second tubular body 44. The first tubular body 42 further comprises two press release buttons one on either side of the body at about the same distance from the lower end. The second tubular body 44 further comprises corresponding apertures to receive the press release buttons such that when the first tubular body 42 is inserted into the second tubular body 44 the length may be adjusted by depressing the press release buttons and allowing them to lock into place at the desired length.

The second tubular body 44 may be provided in a variety of shapes but is preferably tubular. The tubular configuration includes a variety of tubular geometry's such as for example triangular tubular, square tubular, rectangular tubular, cylindrical tubular, oval cylindrical tubular and the like. The diameter of the inside surface of the secondary end of the second tubular body 44 is approximately the same or slightly less than the diameter of the drilling or cutting tool chuck 20 to allow the secondary end to be removably affixed to the chuck 20. Preferably, the secondary end of the second tubular body 44 is press-fit onto the tool chuck 20.

The diameter of the inside surface of the primary end is slightly greater than the diameter of the outer surface of the first tubular body 42 lower end to allow the movement of the first tubular body 42 within the second tubular body 44. The second tubular body 44 may further comprise a series of apertures on opposite sides and over the length of the tubular body to receive press release buttons as previous suggested.

The first tubular body 42 may also be provided in a variety of shapes but is preferably the same or a similar shape as the second tubular body 44. The diameter of the outer surface is slightly less than the inside surface of the second tubular body 44 to allow movement of the first tubular body 42 within the second tubular body 44. As suggested above the outer surface may further comprise press release buttons on either side near the upper end of the first tubular body 42 for engaging the press release button apertures provided along the length of the second tubular body 44 for adjusting the length of the extension means. The diameter of the outer surface of the upper end of the first tubular body 42 is slightly smaller that internal diameter of the second end of the spring 14. The spring 14 may be affixed to the outer surface of the upper end by a variety of methods known in the art including for example, press-fit, snap-fit or adhesive. Alternatively, a seat 46 may be provided around the perimeter of the upper end of the first tubular body 42 that is continuous or discontinuous. The seat 46 may be provided as a ledge or gutter 48 in which the second end of the spring 14 fits flush against or is secured within. Correspondingly the upper end of the first tubular body 42 may be provided with clips that allow the second end of the spring 14 to be snapped into place. The first end of the spring 14 may then be affixed to the back end of the cylindrical-shaped housing 12.

Assembly

The protective shield may be provided in assembled or disassembled form. In either case the device may be assembled by the consumer or the manufacturer prior to use or sale. In its most limited configuration the protective shield comprises a cylindrical-shaped housing 12, and a spring 14. Assembly is achieved by affixing the first end of the spring 14 to the back end of the cylindrical-shaped housing 12. As stated above a variety of affixing methods may be provided for connecting the spring 14 to the back end of the cylindrical shaped housing 12. Preferably it is press-fit onto the exterior surface or press-fit within the back end.

In another configuration the protective shield may further comprise a slideable means that may be provided separate from the cylindrical-shaped housing 12. In this configuration the slideable means is affixed to the front end of the cylindrical-shaped housing 12 and then the first end of the spring 14 is affixed to the back end of the cylindrical-shaped housing 12. Alternatively, the slideable means may be integral to, part of, or imbedded within the cylindrical-shaped housing 12. In this configuration assembly is performed as stated above wherein the cylindrical-shaped housing 12 and slideable means are treated as a single unit.

In another configuration the protective shield may further comprise a guide 30 to enable the user to maintain a 90° angle relative to the working material when performing a tooling operation. In this configuration the second end of the spring 14 is affixed to the guide 30 such that it extends past the top end of the guide 30. A variety of methods may be used to connect the second end of the spring 14 to the guide 30 but preferably the guide 30 comprises a ridge or seat that secures the second end of the spring 14 onto the guide 30. The first end of the spring 14 is then affixed to the back end of the cylindrical-shaped housing 12. The spring 14 may be affixed by a variety of methods but is preferably press-fit onto or within the back end of cylindrical-shaped housing 12. The cylindrical-shaped housing 12 is then pressed down over the guide 30 compressing the spring 14 and exposing the top end of the guide 30. A retention means is then affixed to the top end of the guide 30 to maintain the cylindrical-shaped housing 12 on the guide 30. A variety of retention means may be used to perform this function. Preferably the retention means is a cap having a tubular body of a diameter slightly less than the diameter of the internal surface of the top end of the guide 30. The top of the cap may be circular having a diameter larger than the internal diameter of the cylindrical-shaped housing 12 with an aperture to permit the tool bit 22 to pass through. The cap may be affixed into place by a variety of methods but is preferably affixed with adhesive. If the protective shield is further provided with a slideable means separate from the cylindrical-shaped housing 12 it may be affixed to the front end of the cylindrical-shaped housing 12 prior to affixing the second end of the spring 14 to the back end.

In another configuration the protective shield may further comprise an extension means 40 to allow the device to be adapted to use with longer tool bits 22. In this configuration the first and second tubular bodies are affixed to one another such that the tool bit 22 does not extend significantly beyond the top end of the first tubular body. Preferably this distance is not more than what would be required to utilize the protective shield effectively. This distance can be determined by first fitting the desired bit 22 in the drilling or cutting tool chuck 20, affixing the assembled device onto the chuck 20 and adjusting the length of the extension means. This may be done by moving the first tubular body 42 within the second tubular body 44 to achieve the desired length and securing the first tubular body 42 within the second tubular body 44 at that distance before use. The second end of the spring 14 is then affixed to the first tubular body 42 such that the spring 14 extends beyond the upper end. The first end of the spring 14 is then affixed to the back end of the cylindrical-shaped housing 12. The spring 14 may be affixed by a variety but is preferably press-fit onto or within the back end. If the protective shield is further provided with a slideable means separate from the cylindrical-shaped housing 12 it may be affixed to the front end of the cylindrical-shaped housing 12 prior to affixing the second end of the spring 14 to the back end.

In another configuration the protective shield may be provided with a guide 30 and an extension means 40 to allow the device to be utilized with a longer tool bit 22 and enable the user to drill or cut at a 90° angle to the surface of the working material. In this configuration the internal surface of the bottom end of the guide 30 is provided with an affixing means such as for example threads. Correspondingly the outer surface of the upper end of the first tubular body 42 comprises threads able to be received by the threads of the bottom end of the guide 30. The guide 30 is then affixed to the upper end of the first tubular body 42 of the extension means. The second tubular body 44 is then affixed to the lower end of the first tubular body 42 and adjusted to the desired length. The second end of the spring 14 is then affixed to the top end of the guide 30 and the first end of the spring 14 is affixed to the back end of the cylindrical-shaped housing 12. If the protective shield is further provided with a slideable means separate from the cylindrical-shaped housing 12 it may be affixed to the front end of the cylindrical-shaped housing 12 prior to affixing the second end of the spring 14 to the back end.

Kit

A variety of kits may be provided to the consumer which may contain one or more different sized cylindrical-shaped housings 12, one or more different slideable means such as a Teflon™ coated ring, a lubricated o-ring and/or a bristle ring, one or more springs 14, one or more guides 30 and one or more extension means. Preferably the kit will comprise one or more different sized cylindrical-shaped housings 12, one or more springs 14 and one or more guides 30. Alternatively, the preferred kit comprises one or more different sized cylindrical-shaped housings 12, one or more springs 14 and one or more extension means. Most preferably the kit comprises one or more different sized cylindrical-shaped housings 12 and one or more springs 14.

Use

The protective shield may be provided as a kit in which the device must be assembled as desired or may be provided in assembled form. Assembling the device may be performed as described above. The assembled protective shield may be affixed to the drilling or cutting tool chuck 20 by a variety of methods. Preferably it is affixed by press-fit. Use of the protective device on a drilling or cutting tool will depend on the tooling operation. If the tooling operation is drilling a screw into the working material it is preferable to use the appropriate bit 22 to drive the screw. For example, if the screw were a Phillips head screw, a Phillips head bit 22 would be desirable. In addition, it may be preferable to use a magnetic bit 22 to secure the screw to the bit 22 for drilling. During this type of operation the user may apply a screw to the magnetic bit 22, fit the front end of the cylindrical-shaped housing 12 flush against the working surface, align the screw at the desired location, bring the screw to the surface of the working material by compressing the protective shield spring 14 and commence the drilling operation. If the tooling operation is drilling a hole the desired size drill bit 22 is selected and secured within the drill chuck 20. The device is press-fit over the chuck 20 and the front end of the cylindrical-shaped housing 12 is fit flush against the working surface. The drill bit 22 is aligned at the desired location, the bit 22 is brought to the surface of the working material by compressing the protective shield spring 14 and drilling is commenced. If the tooling operation is cutting a material to a desired shape the front end of the cylindrical shaped housing 12 or the slideable means contained on the front end of the cylindrical shaped housing 12 is fitted flush against the working surface the cutting bit 22 is aligned at the desired cut location, the bit 22 is brought to the cutting location by compressing the protective shield spring 14 and cutting is commenced.

The protective shield creates a chamber between its cylindrical-shaped housing 12 and the working surface so that debris, such as shavings, burrs or chips emitted during the tooling operation are retained within the chamber, significantly reducing damage to objects or persons in the immediate vicinity of and injury to the user during the tooling operation.

I claim:

1. A protective shield for a drilling or cutting tool comprising: a) a cylindrical-shaped housing having a front end and a back end, said front end able to fit flush against a working surface; b) a spring having a first end and a second end, said first end able to receive said back end of said cylindrical-shaped housing and said second end able to receive a drilling or cutting tool chuck, said cylindrical-shaped housing able to receive debris from said drilling or cutting tool operation; and a foam tube, said foam tube having an exterior surface and an interior surface, said exterior surface able to be received within said spring and said interior surface able to receive a drilling or cutting tool bit.

2. A device according to claim 1 wherein said cylindrical shaped housing further comprises bristle fibers along said front end.

3. A device according to claim 1 further comprising a guide to maintain the centerline of said protective shield on the centerline of said drilling or cutting tool, said guide having top and bottom ends and internal and external surfaces, said internal surface of said bottom end able to receive a drilling or cutting tool chuck and said external surface able to receive said first end of said spring, said top end external surface able to be received by said back end of said cylindrical-shaped housing said top end having a retention means so that said cylindrical-shaped housing is maintained on said guide during use said second end of said spring able to receive said back end of said cylindrical-shaped housing.

4. A device according to claim 3 wherein said guide is made of a heat resistant, impact resistant material.

5. A device according to claim 3 wherein said protective shield further comprises a chamber formed between said drilling or cutting tool chuck and said guide to capture debris from said drilling or cutting tool operation.

6. A device according to claim 3 wherein said guide further comprises a magnet to receive magnetically susceptible debris from said drilling or cutting tool operation.

7. A device according to claim 1 further comprising an extension means and at least one light source to illuminate said working surface, said extension means comprising a first tubular body and a second tubular body, said first tubular body having a upper, a lower end, an outer surface and an inner surface, said upper end able to receive said second end of said spring; said second tubular body having a primary end, a secondary end, an inside surface and an outside surface, said secondary end able to receive said drilling or cutting tool chuck, said inside surface able to receive said lower end of said first tubular body and wherein said at least one light source is at least one light emitting diode.

8. A kit comprising at least one protective shield for a drilling or cutting tool comprising a cylindrical-shaped housing having a front end and a back end, said front end able to fit flush against a working surface and a spring having first and second ends, said first end able to receive said back end of said housing and said second end able to receive a drilling or cutting tool chuck, said cylindrical housing able to receive debris from said drilling or cutting tool during use; and at least one guide to maintain the centerline of said protective shield on the centerline of said drilling or cutting tool, said guide having top and bottom ends and internal and external surfaces, said internal surface of said bottom end able to receive a drilling or cutting tool chuck and said external surface able to receive said first end of said spring, said top end external surface able to be received by said back end of said cylindrical-shaped housing said top end having a retention means so that said cylindrical-shaped housing is maintained on said guide during use said back end of said cylindrical-shaped housing able to receive said second end of said spring.

9. A kit according to claim 8, further comprising at least one extension means said extension means comprising; a first tubular body and a second tubular body, said first tubular body having a upper, a lower end, an outer surface and an inner surface, said upper end able to receive said second end of said spring and said outer surface being threaded; said second tubular body having a primary end, a secondary end, an inside surface and an outside surface, said secondary end able to receive said drilling or cutting tool chuck, said inside surface being threaded to receive said lower end of said first tubular body.

\* \* \* \* \*